Aug. 28, 1962   H. P. BRUVOLD   3,051,504
TRAILER WITH VERTICALLY ADJUSTABLE FRAME
Filed Dec. 24, 1959

Harold Perry Bruvold
INVENTOR.

BY Ramsey and Kolisch
Attys.

United States Patent Office 3,051,504
Patented Aug. 28, 1962

3,051,504
TRAILER WITH VERTICALLY ADJUSTABLE FRAME
Harold Perry Bruvold, 5106 Fairview Ave., Boise, Idaho
Filed Dec. 24, 1959, Ser. No. 861,857
2 Claims. (Cl. 280—43.18)

This invention relates to a construction for a trailer, and more particularly to a trailer construction wherein the frame of the trailer may be dropped to ground level, thus to provide stable ground support for any load carried on the trailer. The invention includes a novel construction for the frame that is light yet entirely adequate to give rigid support for heavy loads, with the load either in a raised or lowered position.

Generally it is an object of the invention to provide an improved construction for a trailer, wherein the wheels of the trailer may be shifted up or down relative to the trailer frame, and this may be done easily and quickly.

Another general object is to provide such a trailer that includes a frame constructed so that when it is dropped on the ground, it rests squarely on the ground and provides completely stable support for any load mounted on the trailer.

Still another object is to provide a trailer construction wherein the frame of the trailer includes novel means for detachably securing a load in position on the trailer.

In handling different trailer loads, frequently it is desirable to move the load from place to place and then set it down firmly on the ground. This invention concerns a trailer for such use. In general terms, the trailer comprises frame structure supported on either side by a pair of lateral support wheels. The trailer frame structure has front and rear transversely extending frame sections that have bottom portions adapted to rest firmly on the ground when the frame is lowered relative to the wheels. The top portions of the frame sections define a support plane for the load carried by the trailer. Extending longitudinally of the trailer frame disposed over the transverse frame sections are laterally spaced longitudinals made integral with the transverse frame sections. To secure a load on the trailer frame, clamp bars are provided that are detachably connected to longitudinals. These clamp bars have ends that may be clamped firmly down on a load with the transverse frame sections underlying and supporting the load.

At each side of the trailer frame there are provided axle bearings mounted at an elevation spaced above the support level defined by the trailer frame. Rotatably journaled in each of these bearings is a drop axle, having offset wheel spindles. These wheel spindles mount the support wheels. Lever arms integral with the drop axles are provided to rotate the drop axles and shift the wheel spindles up or down. The spindles in one position hold the trailer wheels in a lowered position relative to the frame. The axles may be rotated to raise the wheels relative to the frame and place the frame squarely on the ground. In a lowered position (ground-traveling position), the levers connected to the drop axles are connected to the trailer frame by means of bias mechanisms that yieldably accommodate slight rotating of the axles as the trailer travels over the ground. The bias mechanisms then act as shock absorbers. The trailer construction is relatively light, has requisite strength and expanse to handle a wide variety of heavy and light loads of different sizes. It is economical to produce. Shifting of the trailer up or down may be done easily and quickly with a minimum amount of effort.

Other objects and advantages are attained by the invention, the same being described hereinbelow in conjunction with the accompanying drawings, wherein.

Figure 1:
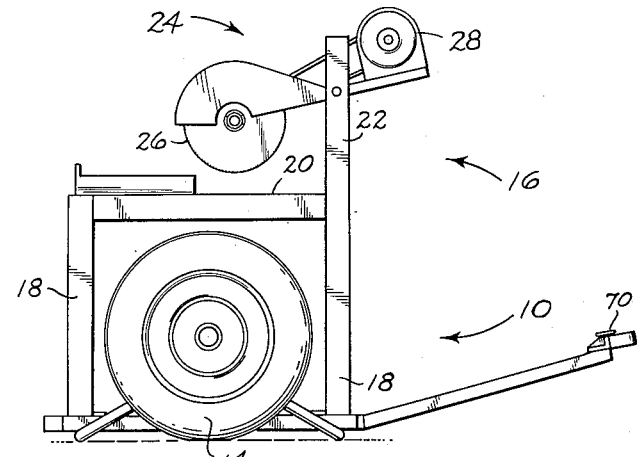
FIG. 1 is a side view, somewhat simplified, of a trailer constructed according to this invention, with the trailer in the particular embodiment shown supporting a masonry saw mechanism and showing the trailer with the wheels raised.
Figure 2:
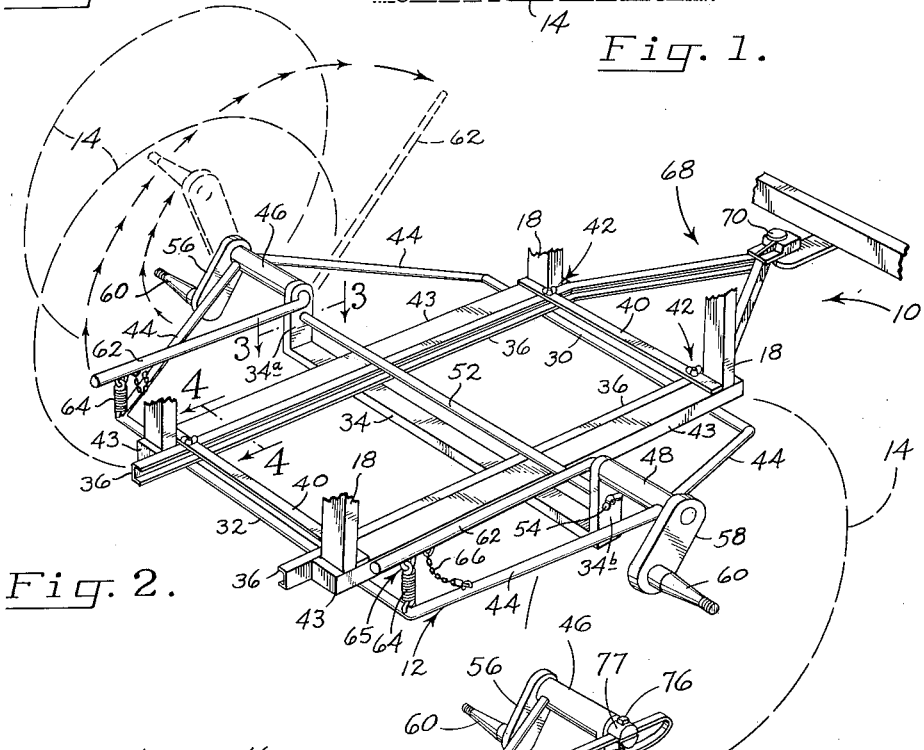
FIG. 2 is a perspective view of the trailer with the masonry saw mechanism removed to illustrate details of construction.

Referring now to drawings, and in particular to FIGS. 1 and 2, 10 indicates generally a trailer constructed according to this invention. The trailer comprises frame structure 12, and a pair of lateral support wheels 14 at each side of frame 12. Secured to frame 12 and loading the frame, in the particular embodiment illustrated, is a masonry saw mechanism indicated at 16. This includes legs 18 mounting a work supporting surface 20, and at one end of the apparatus upstanding portions 22. Portions 22 support a saw mechanism 24 including a circular saw 26 driven by a motor 28. The masonry saw illustrated is typical, and well known in the art, thus it is not detailed and further description of the saw mechanism is not considered necessary to an understanding of the invention. The saw mechanism is exemplary of apparatus that is transported from time to time from one location to another (such as between different building sites). At a given location it is desirable to rest the saw mechanism firmly on the ground, in order that a stable foundation be provided. While the invention herein is described in conjunction with a masonry saw, it should be understood that the trailer frame lends itself for other uses where stationary support for a mobile load is desired.

Figure 3:
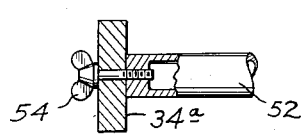
FIG. 3 is a section view along line 3—3 in FIG. 2.
Figure 4:
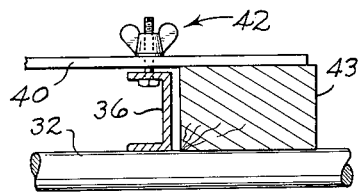
FIG. 4 is a section line along the line 4—4 in FIG. 2.

Considering now more specifically construction of the trailer, and referring now to FIGS. 2, 3 and 4, frame 12 comprises a pair of elongated and transversely extending frame sections 30, 32 at the front and rear ends of the trailer, respectively. Intermediate and parallel to frame sections 30, 32 is a brace 34. Brace 34 has upstanding end portions 34a, 34b at either end. The frame sections 30, 32, and the central portion of brace 34 occupy substantially a common horizontal plane. They have bottom portions defining a base for the trailer that is adapted to rest squarely on the ground. Top portions of the frame sections and brace 34 define a support plane for a load on the trailer (saw mechanism 16). The various frame sections are secured together and made rigid by longitudinals 36 (channel irons), laterally spaced on the trailer frame and extending the length of the trailer frame. These are fixed as by welding to the sections 30, 32 and brace 34. Extending transversely over the top of longitudinals 36 are clamp bars 40. These are detachably secured to longitudinals 36 by wing nut and screw assemblies 42. The shanks of the screws in the assemblies pass through suitable bores provided in the flanges of longitudinals 36 (see FIG. 4). The saw mechanism 16 at the base thereof has beams 43 made fast on the saw mechanism. The beams are fitted along side longitudinals 36 and underneath the ends of clamp bars 40. The clamp bars may be brought down firmly against the tops of the beams by tightening nut and screw assemblies 42, the beams 43 having slightly wider width then longitudinals 36. The clamp bars are effective to produce a firm mounting of the saw mechanism on the trailer frame.

Integral with the ends of frame sections 32, on both sides of the trailer frame, are inclined frame sections 44 that slope upwardly and outwardly from the ends of the frame sections. These are joined (as by welding) to a set of axle bearings, indicated at 46, 48, provided opposite sides of frame 12. The axle bearings are also supported on the extremities of ends 34a, 34b of brace 34. A detachable stiffening bar 52 intermediate ends 34a, 34b further braces the mounting of bearings 46, 48. This bar 52 is secured in place as by using wing screw 54, as illustrated in FIG. 3.

Journaled in bearings 46, 48 are a pair of drop axles, indicated at 56, and 58. Each of these includes a spindle portion 60, that rotatably mounts one of the support wheels 14. Spindle portions 60 are radially offset from the portions of the axles journaled in 46, 48. Thus on rotation of the drop axles, spindles 60 shift between raised and lowered positions relative to the frame, as illustrated in FIG. 2. The left drop axle in FIG. 2, in the position shown in solid lines, holds a support wheel 14 in a lowered position relative to the trailer frame, or in a ground-traveling position. When the drop axle is rotated to a position shown in dotted lines in FIG. 2, spindle 60 for the axle moves to a raised position relative to the frame, and the support wheel for the axle moves upwardly. With both axles in this position, the frame is in a stationary position and rests on the ground. The drop axles are rotated between a position raising and a position lowering the wheels by lever arms 62 joined at one end of the drop axles, and extending to the rear of the trailer with the trailer wheels in a ground-traveling position.

Connecting frame 12 and the ends of lever arms 62 that are outwardly of axles 56, 58 are bias mechanisms or coil springs 64. The coil springs are connected to the lever arms at their upper ends by hook and eye connections 65. Thus they provide a detachable connection. The springs accommodate slight rotation of the axles and swinging of the lever arms as the wheels of the trailer travel over the ground and move up and down in response to jars and shocks imparted thereto. Thus the coil springs function as shock absorbers in the organization. As a safety measure, a chain 66 is included for each lever arm to hold the lever arm down should a coil spring break.

At the far end of the trailer there is provided an A-frame portion 68 that mounts a hitch mechanism 70 used in attaching the trailer to a towing vehicle, in a conventional manner.

Figures 5, 6:
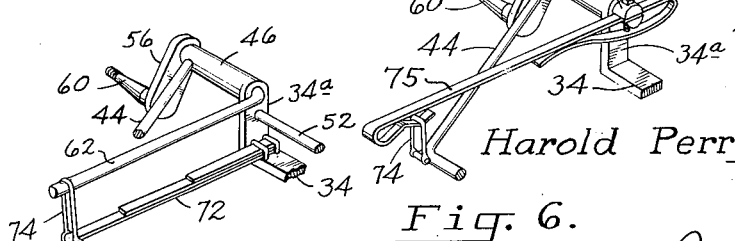
FIG. 5 is a perspective view of portions of a modified form of my invention.
FIG. 6 is a perspective fragmentary view of a still further modification of my invention.

In FIG. 5, a modification of the invention is illustrated. In this modification each coil spring 64 is replaced by a leaf spring assembly 72. The leaf spring assembly is affixed to brace 34, and has its outer end detachably connected to a lever by a bail member 74. To disconnect a lever arm from the spring, the lever arm is pushed downwardly, which loosens the bail member so that it can be swung away from the outer spring end.

In FIG. 6, a modification of the invention is illustrated. In this modification each coil spring 64 and lever arm 62 is replaced with a specially bent leaf spring and lever arm 75. This spring and lever arm 75 is inserted in a slot in axle piece 77 and retained by a bolt 76. To disconnect spring lever arm from frame member 44, push downwardly, which loosens the bail member 74, so that it can be swung away from the hooked end of spring lever.

The trailer structure described is extremely useful and versatile. When the load is moved over the road, the lever arms are locked in the lowered position of FIG. 2, which moves the wheels downwardly relative to the trailer frame. The springs securing the lever arms function as shock absorbers, while holding the lever arms in their lowered horizontal position. To place the trailer frame on the ground, the springs are disconnected after first pressing downwardly slightly on the lever arms to free the springs. The lever arms may then be swung upwardly, with the weight of the load pushing the frame downwardly relative to the wheels. This places the bottom of the frame squarely in contact with the ground, and a solid support is provided for the masonry saw mechanism.

The bearings for the drop axles are mounted above the support plane of the trailer. This accommodates a relatively narrow frame construction, with the bearings suitably elevated above the ground when the frame is in its lowered position. It should also be noted that the levers are down to one side and out of the way with the wheels in their ground-transport position. Also important is the feature wherein there is provided a separate drop axle for each wheel, so that each is adjustable independently of the other. This latter feature makes it easier for a single person alone to raise or lower the frame.

It is claimed and desired to secure by Letters Patent:

1. A trailer comprising a load-supporting frame; said frame having elongated and transversely extending frame sections at the front and rear thereof occupying substantially a common plane, and a pair of inclined frame sections on each side of the frame, one for each of the transversely extending frame sections, secured to the transversely extending frame sections and converging at a location spaced outwardly of the ends of the transversely extending frame sections and intermediate the ends of the frame; an axle bearing on each side of said frame mounted on the ends of the pairs of inclined frame sections and disposed above the plane of said transversely extending frame sections; said frame including a transverse brace member intermediate the ends of the frame extending between the axle bearings; a drop axle rotatably journaled in each axle bearing including an offset wheel spindle; a support wheel rotatably mounted on each wheel spindle; an arm connected to each drop axle; and means including bias mechanism detachably connecting each arm to said frame.

2. A trailer comprising a load-supporting frame; said frame having elongated and transversely extending frame sections at the front and rear thereof occupying substantially a common plane with bottom portions defining a base for the frame adapted to rest squarely on the ground and top portions defining a support plane for a load, laterally spaced longitudinals disposed over the transversely extending frame sections and secured thereto, a pair of inclined frame sections on each side of the frame secured to the transversely extending frame sections, one to each, and converging at a location spaced outwardly of the ends of the transversely extending frame sections and intermediate the ends of the frame, and at least a pair of transversely extending clamp bars detachably connected to and extending over the tops of the longitudinals for securing a load in place on the frame; support wheels outwardly of either side of said frame; and means disposed laterally outwardly of said longitudinals mounting the support wheels on said frame; the latter means comprising an axle bearing mounted on the ends of the pairs of inclined frame sections, a drop axle rotatably journaled in each axle bearing including an offset wheel spindle rotatably mounting one of said support wheels, an arm connected to each drop axle, and means detachably connecting each arm to the frame including bias mechanism interposed between the frame and arm accommodating swinging of the arm on rotation of the drop axle; said frame including a brace member disposed intermediate the ends of the frame extending between said bearings.

References Cited in the file of this patent

UNITED STATES PATENTS

| | | |
|---|---|---|
| 7,575 | Drake | Aug. 20, 1850 |
| 1,184,129 | Quinn | May 23, 1916 |
| 1,691,583 | Pearson | Nov. 13, 1928 |
| 2,109,098 | Baxter | Feb. 22, 1938 |
| 2,478,795 | Whalen et al. | Aug. 9, 1949 |
| 2,610,865 | Cantrell | Sept. 16, 1952 |
| 2,621,942 | Getz | Dec. 16, 1952 |
| 2,660,443 | Miller | Nov. 24, 1953 |
| 2,740,543 | Moundson | Apr. 3, 1956 |
| 2,762,631 | Entz | Sept. 11, 1956 |
| 2,767,997 | Summers | Oct. 23, 1956 |
| 2,781,529 | Moody | Feb. 19, 1957 |
| 2,787,476 | Holsclaw | Apr. 2, 1957 |
| 2,806,710 | Mascaro | Sept. 17, 1957 |